May 12, 1942.  A. L. KOENIG  2,282,482
BOTTLE CONTAINER
Filed Dec. 19, 1939  2 Sheets-Sheet 2
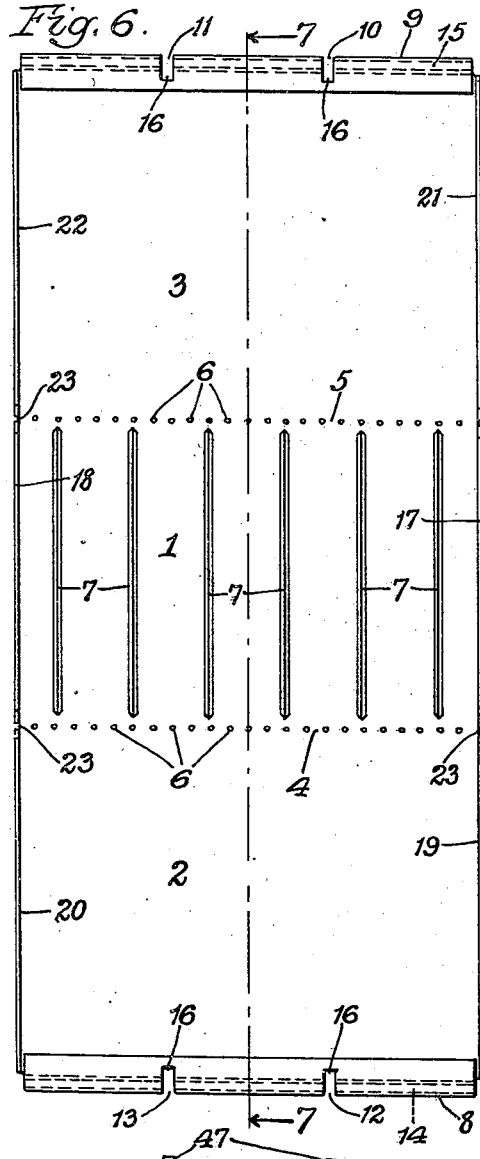
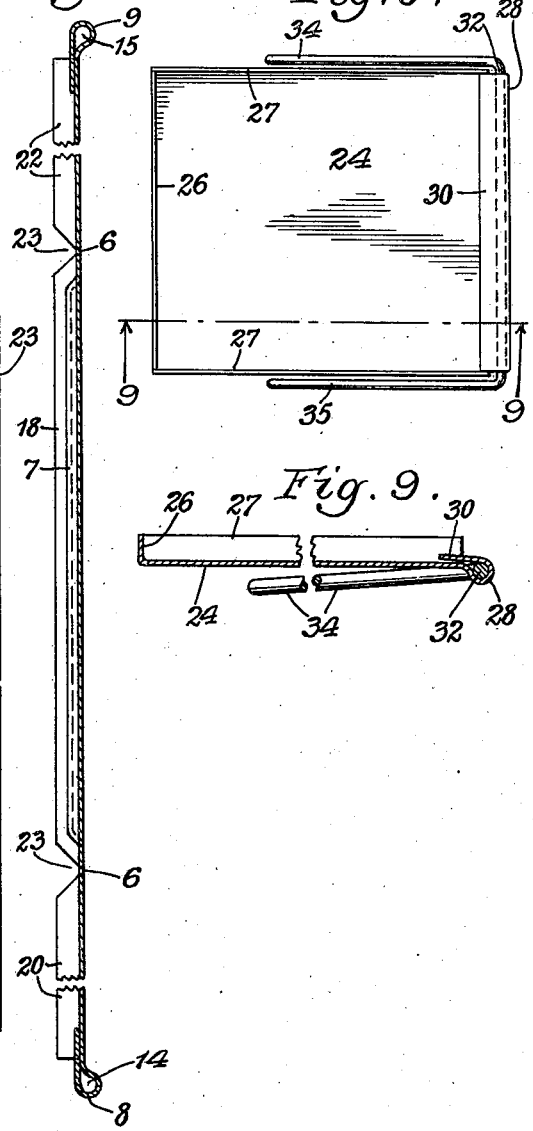
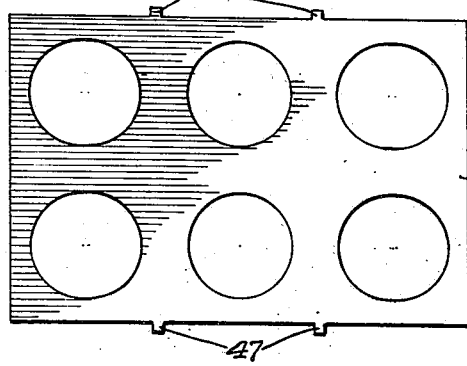
Inventor.
Alphonso L. Koenig
by Parker & Carter
Attorneys.

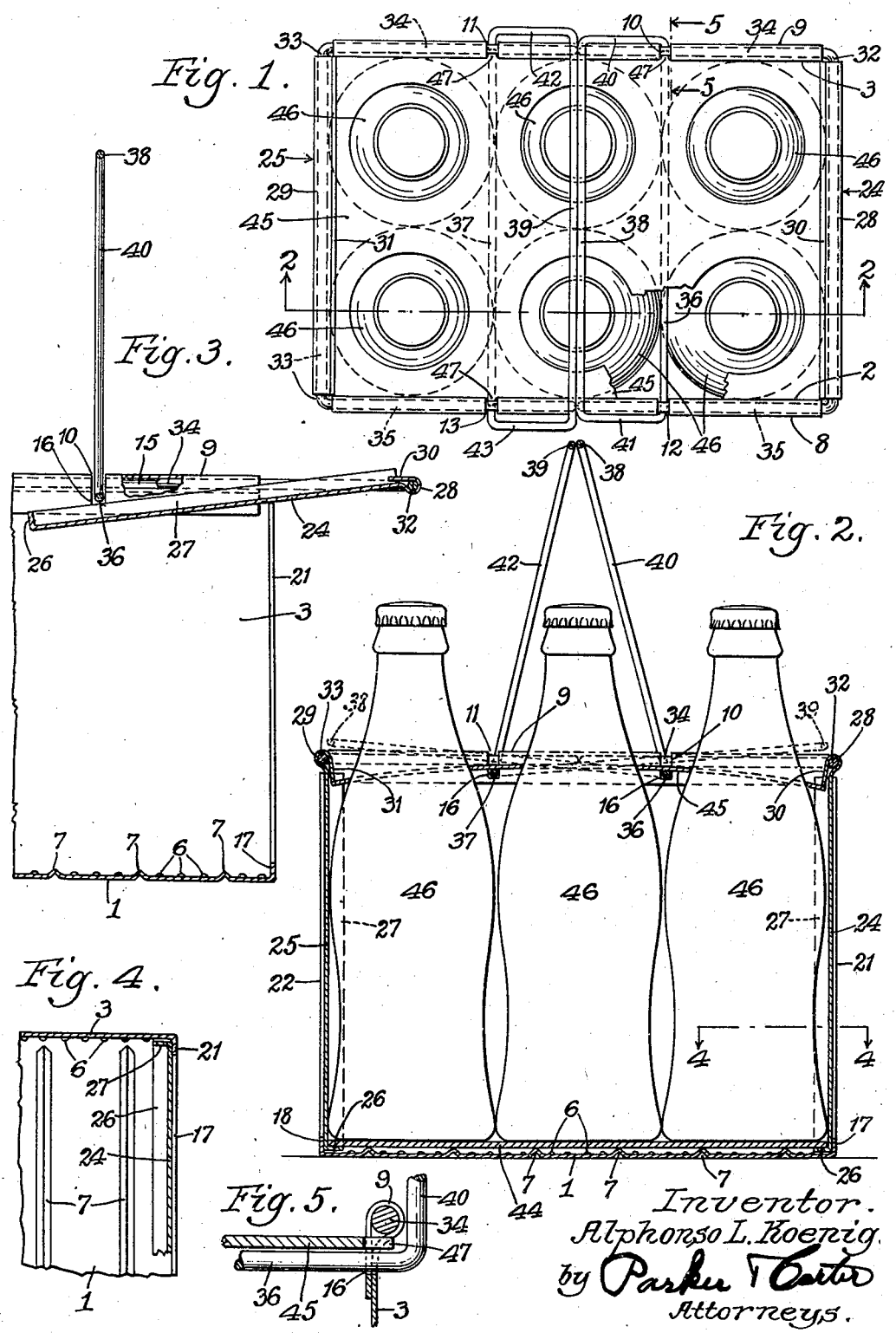

Patented May 12, 1942

2,282,482

UNITED STATES PATENT OFFICE 2,282,482

BOTTLE CONTAINER

Alphonso L. Koenig, Chicago, Ill., assignor to The Dole Valve Company, Chicago, Ill., a corporation of Illinois Application December 19, 1939, Serial No. 309,978

4 Claims. (Cl. 224—45)

This invention relates to bottle containers and has for its object to provide a new and improved device of this description.

The invention has as a further object to provide a bottle container for handling a plurality of bottles containing a beverage and which can be used a number of times. The invention has as a further object to provide a bottle container which will exclude vermin.

The invention has as a further object to provide a metallic bottle container which can be collapsed or flattened out for shipment and storage and which can be easily and quickly assembled to receive and hold the bottles. The invention has as a further object to provide a metallic bottle container where the bottles project above the upper edge of the container and which has a handle which can be easily and quickly moved out of the way.

The invention has further objects which are more particularly pointed out in the accompanying description.

Referring now to the drawings, Fig. 1 is a plan view of one form of device embodying the invention;

Fig. 2 is a sectional view taken on line 2—2 of Fig. 1;

Fig. 3 is a partial section similar to Fig. 2, with the bottles omitted, showing the method of assembling the container;

Fig. 4 is a detailed enlarged sectional view taken on the line 4—4 of Fig. 2;

Fig. 5 is a detailed enlarged sectional view taken on the line 5—5 of Fig. 1;

Fig. 6 is an inside face view of the bottom and side wall members completely formed except for the bending of the sides on the perforated lines;

Fig. 7 is a sectional view taken on line 7—7 of Fig. 6, on a larger scale and with parts broken away;

Fig. 8 is a view of the end wall member;

Fig. 9 is a sectional view taken on line 9—9 of Fig. 8; and

Fig. 10 is a plan view of the vermin excluding cover.

Like numerals refer to like parts throughout the several figures.

Referring now to the drawings, I have illustrated a bottle container containing a plurality of bottles. In this instance I have shown six bottles, but it is of course evident that other numbers of bottles can be used. The six bottle container is particularly adapted for use in connection with beverages, for example, where six bottles are sold for twenty-five cents and delivered to or taken home by a consumer.

In forming the container, there is provided a flat sheet metal piece, preferably of sheet tin, as illustrated in Fig. 6. This piece when the device is assembled, provides the bottom 1 and the sides 2 and 3 of the container. The sides 2 and 3 are bent along the lines 4 and 5 so as to be at substantially right angles to the bottom 1. The lines 4 and 5 may be provided with a series of perforations 6, if desired, to make it easier to bend the sides to assemble the device. The bottom is preferably provided with the inwardly projecting ribs 7. The edges of the sides 2 and 3 are formed with the loops 8 and 9 which are preferably integral with the sides and which are formed by bending the material of the sides as shown. These loop portions are provided with the slots 10, 11, 12 and 13. These loops are provided with receiving spaces 14 and 15 and the slots 10, 11, 12 and 13 are provided with portions 16 which extend beyond the receiving spaces 14 and 15, as clearly shown in Fig. 6.

The bottom 1 is provided with upwardly extending flanges 17 and 18. The side 2 is provided with similar flanges 19 and 20 and the side 3 with similar flanges 21 and 22. Material is cut away at 23 between these flanges so that the sides may be bent at right angles to the bottom 1.

The container is provided with two end walls 24 and 25. These walls are provided at the bottom with inwardly projecting flanges 26 and at the sides with inwardly projecting flanges 27. At the top, these end pieces are provided with loops 28 and 29 which are preferably formed integral with the end pieces by bending the material. The inside pieces 30, 31 which form these loops, project down below the loops, as shown in Fig. 2, to act as a stop for the vermin excluding cover. These loops 28 and 29 are provided with spaces into which are received rods 32 and 33 which extend across the end pieces and which are preferably U-shaped, having members 34 and 35, Fig. 8, which extend into the spaces 14 and 15 in the sides 2 and 3.

There are preferably two handles, each preferably being continuous. These handles have portions 36 and 37 which are inserted in the slots 10, 11, 12 and 13 and which extend across the container, as clearly shown in the drawings. These members act as a support for the vermin excluding cover. The handles also have the members 38 and 39 at the top, which are grasped by the hand by the party carrying the container, and the members 40 and 41 which connect the members 36 and 38 and the members 42 and 43 which connect the members 37 and 39. One of the handles is preferably shorter than the other, as shown for example in Fig. 1, where the handle with the handle portion 38 is shorter than the handle with the handle portion 39. This permits one handle to be folded within the other on the top of the container, as shown in dotted lines in Fig. 2.

In assembling the device, the parts 36 and 37 of the handles are placed in the slots and then the members 34 and 35 of the end pieces are inserted in the openings 14 and 15 in the sides and they then extend on top of the handle pieces so as to hold them in position, as shown in Fig. 1. In assembling the end pieces, the members 34 and 35 are folded to be almost parallel with their associated end pieces and then they are inserted in the openings 14 and 15 until they are fully inserted. Fig. 3 shows these members partially inserted in the openings 14 and 15. The bottoms of these end pieces project on the interior of the container, as shown in Fig. 3, and when the members 34 and 35 are fully inserted, then the end pieces are moved down to the position shown in Fig. 2. In this position the end pieces are on the inside of the projections or flanges 17, 18, 19, 20, 21 and 22 of the bottom and sides and these projections or flanges hold the end pieces from outward movement. The end pieces are held from inward movement by the removable bottom 44 which may be of any material desired. I prefer to make it of stiff cardboard. This removable bottom rests on the ribs 7 and the inwardly turned parts 26 on the end pieces. The ribs 7 are of sufficient height so that their tops are on a level with the upper face of the inwardly turned parts 26.

At the top of the device is a removable vermin excluding cover 45 which has openings in it through which the necks of the bottles 46 project. This vermin excluding cover may be of any desired material, preferably flexible, and is placed in position from the top and the ends thereof bent down to extend under the pieces 30 and 31 to hold the cover in position. The cover is also preferably provided with projections 47 which extend into the bottom portions 16 of the notches 10, 11, 12 and 13 and project under the members 34 and 35 so as to hold the sides of the cover in position. When it is desired to remove the cover, it is simply pulled upwardly and the parts bend, so that it can be easily removed. The openings in the cover for the end bottles are arranged so that the end may be bent down, as shown in Fig. 2. This means that they must be somewhat larger, or of an oval shape, than the openings for the central bottles.

It will be noted that the sides and ends of the container are preferably flat and smooth so that advertising matter may be placed thereon. The handle portions have spring members 36 and 37 which extend across the space at the top of the enclosure, each of these members being separated from the adjacent wall of the container parallel thereto by a space smaller than the largest diameter of the bottles which enter this space, so that such member must be sprung to one side to permit the bottles to enter this space. This is illustrated in Fig. 2 of the drawings.

The use and operation of my invention are as follows.

The container is made out of sheet metal, such as sheet tin. The bottom 1 and sides 2 and 3 are made integral, as shown in Fig. 6. The ends are then made as shown in Fig. 8. The container is then shipped by placing the ends and the sides and bottom together in a flat condition so that they take up very little room. The parts are stored in this flat condition until ready for use. When ready for use, the sides 2 and 3 then bent up so as to be substantially at right angles to the bottom 1. The handle members 36 and 37 are then inserted in the slots 10, 11, 12 and 13. The ends 24 and 25 are then placed in position. To do this, the ends are moved until they are almost parallel with the members 34 and 35, as shown in Fig. 3, and the members 34 and 35 are then inserted in the loops at the upper ends of the sides, and extend above the members 36 and 37 of the handles so as to hold the handles in position. The ends are then moved down to the position shown in Figs. 1 and 2. The bottom 44 is then placed in position. The bottles of beverage are then placed in the container and the vermin excluding cover 45 is placed in position with the necks of the bottles projecting therethrough. The ends are then bent down to bring them under the parts 30 and 31. The projections 47 are then inserted in the parts 16 of the slots 10, 11, 12 and 13.

I claim:

1. A bottle container comprising a bottom and sides formed integral and having cylindrical shaped loops at their upper edges, each loop having two separated notches transversely thereof, a handle consisting of two continuous members having bottom cross members which extend across the container, and having portions thereof which are located in said notches, end pieces having loops at their upper edges, and a connecting member attached to each end piece, each connecting member having a part located in the loop of its associated end piece and two members projecting at right angles therefrom, said members extending into the loops of the upper edges of the sides and projecting past said notches above the handle members to hold the handle members in place.

2. A bottle container comprising a bottom and sides formed integral and having cylindrical shaped loops at their upper edges and inwardly projecting flanges at their other edges, each loop having two separated notches transversely thereof, a handle consisting of two continuous members having bottom cross members which extend across the container, and having portions thereof which are located in said notches, end pieces having loops at their upper edges, and a connecting member attached to each end piece, each connecting member having a part located in the loop of its associated end piece and two members projecting at right angles therefrom, said members extending into the loops of the upper edges of the sides and projecting past said notches above the handle members to hold the handle members in place, the end pieces engaging the inner faces of the flanges on the bottom and sides so as to be held in place thereby.

3. A bottle container comprising a bottom and sides formed integral and having cylindrical shaped loops at their upper edges, each loop having two separated notches transversely thereof, a handle consisting of two continuous members having bottom cross members which extend across the container, and having portions thereof which are located in said notches, end pieces having loops at their upper edges, a connecting member attached to each end piece, each connecting member having a part located in the loop of its associated end piece and two members projecting at right angles therefrom, said members extending into the loops of the upper edges of the sides and projecting past said notches above the handle members to hold the handle members in place, a vermin excluding cover having holes therethrough for the necks of the bottles, and means for holding said cover in its operative position, said cover extending above the portions of the handle members extending across the container between the notches so as to be supported thereby.

4. A bottle container comprising an enclosure open at the top, a handle consisting of two continuous loops attached to said container, each loop having a spring member which extends across the space at the top of the enclosure, each member separated from the adjacent wall of the container parallel thereto by a space smaller than the largest diameter of the bottles which enter this space, so that said member must be sprung to one side to permit the bottles to enter said space.

ALPHONSO L. KOENIG.